(12) United States Patent
Love, III et al.

(10) Patent No.: US 10,005,094 B2
(45) Date of Patent: Jun. 26, 2018

(54) APPARATUS FOR CONTROLLED APPLICATION OF LIQUID STREAMS TO A SUBSTRATE WITH DIVERTED LIQUID COLLECTION SYSTEM

(71) Applicant: Milliken & Company, Spartanburg, SC (US)

(72) Inventors: Franklin S. Love, III, Columbus, NC (US); Joseph E. Rumler, Greenville, SC (US); Mark A. Hornung, Campobello, SC (US); James C. Bryant, Cowpens, SC (US); Sharon E. Koh-Fallet, Simposnville, SC (US)

(73) Assignee: Milliken & Company, Spartanburg, SC (US)

( * ) Notice: Subject to any disclaimer, the term of this patent is extended or adjusted under 35 U.S.C. 154(b) by 0 days. days.

(21) Appl. No.: 15/065,995

(22) Filed: Mar. 10, 2016

(65) Prior Publication Data
US 2016/0184855 A1 Jun. 30, 2016

Related U.S. Application Data

(63) Continuation of application No. 12/850,180, filed on Aug. 4, 2010.

(51) Int. Cl.
*B05B 15/04* (2006.01)
*B05B 7/08* (2006.01)
(Continued)

(52) U.S. Cl.
CPC ........ *B05B 15/0406* (2013.01); *B05B 7/0815* (2013.01); *B05B 12/18* (2018.02);
(Continued)

(58) Field of Classification Search
None
See application file for complete search history.

(56) References Cited

U.S. PATENT DOCUMENTS

| | | | |
|---|---|---|---|
| 3,937,045 A | 2/1976 | Klein et al. | 68/205 R |
| 3,939,675 A | 2/1976 | Klein | 68/205 R |

(Continued)

FOREIGN PATENT DOCUMENTS

| | | |
|---|---|---|
| DE | 44 26 984 | 2/1996 |
| DE | 10 2006 029 764 | 1/2008 |
| WO | WO 91/12088 | 8/1991 |

OTHER PUBLICATIONS

Patent Cooperation Treaty PCT International Search Report, dated Oct. 31, 2011. International Application No. PCT/US2011/043963. International Filing Date: Jul. 14, 2011.

*Primary Examiner* — Jethro M Pence
(74) *Attorney, Agent, or Firm* — Brenda D. Wentz

(57) ABSTRACT

An improved system for application of liquid streams to a substrate. The system incorporates open face flow channels for carrying the liquid away from fully enclosed flow segments prior to discharge along an unconstrained flow path. The present invention further provides an improved, self-aligning modular assembly for delivery of impingement jet to the liquid streams for diverting the direction of the liquid streams. The present invention further provides an improved arrangement for collection of the deflected liquid in response to application of the impingement jet without excess residue build-up.

12 Claims, 6 Drawing Sheets

(51) Int. Cl.
*B05C 5/02* (2006.01)
*D06B 1/02* (2006.01)
*D06B 11/00* (2006.01)
*B05B 14/00* (2018.01)
*B05B 12/18* (2018.01)

(52) U.S. Cl.
CPC ............ *B05B 14/00* (2018.02); *B05C 5/0279* (2013.01); *D06B 1/02* (2013.01); *D06B 11/0059* (2013.01); *Y02P 70/36* (2015.11)

(56) References Cited

U.S. PATENT DOCUMENTS

| | | | |
|---|---|---|---|
| 3,942,342 A | 3/1976 | Klein et al. | 68/205 R |
| 3,942,343 A | 3/1976 | Klein | 68/205 R |
| 3,969,779 A | 7/1976 | Stewart, Jr. | 8/149 |
| 4,019,352 A | 4/1977 | McCollough, Jr. et al. | 68/205 R |
| 4,059,880 A | 11/1977 | Klein | 29/157 |
| 4,095,444 A | 6/1978 | Pascoe, Sr. et al. | 68/205 R |
| 4,202,189 A | 5/1980 | Addis et al. | 68/205 R |
| 4,392,366 A | 7/1983 | Godfrey | 68/205 R |
| 4,434,632 A | 3/1984 | McCollough, Jr. et al. | 68/205 R |
| 4,616,794 A | 10/1986 | King | 248/67.5 |
| 4,828,174 A * | 5/1989 | Love, III | D06C 23/00 137/806 |
| 4,923,743 A * | 5/1990 | Stewart, Jr. | B05B 7/066 118/315 |
| 5,016,308 A | 5/1991 | McBride et al. | 8/149 |
| 5,033,143 A * | 7/1991 | Love, III | D04H 18/04 239/434 |
| 5,159,824 A | 11/1992 | Stewart, Jr. | 68/205 R |
| 5,325,556 A | 7/1994 | Stewart, Jr. et al. | 8/151 |
| 2001/0025515 A1 | 10/2001 | Petty | 68/205 R |

* cited by examiner

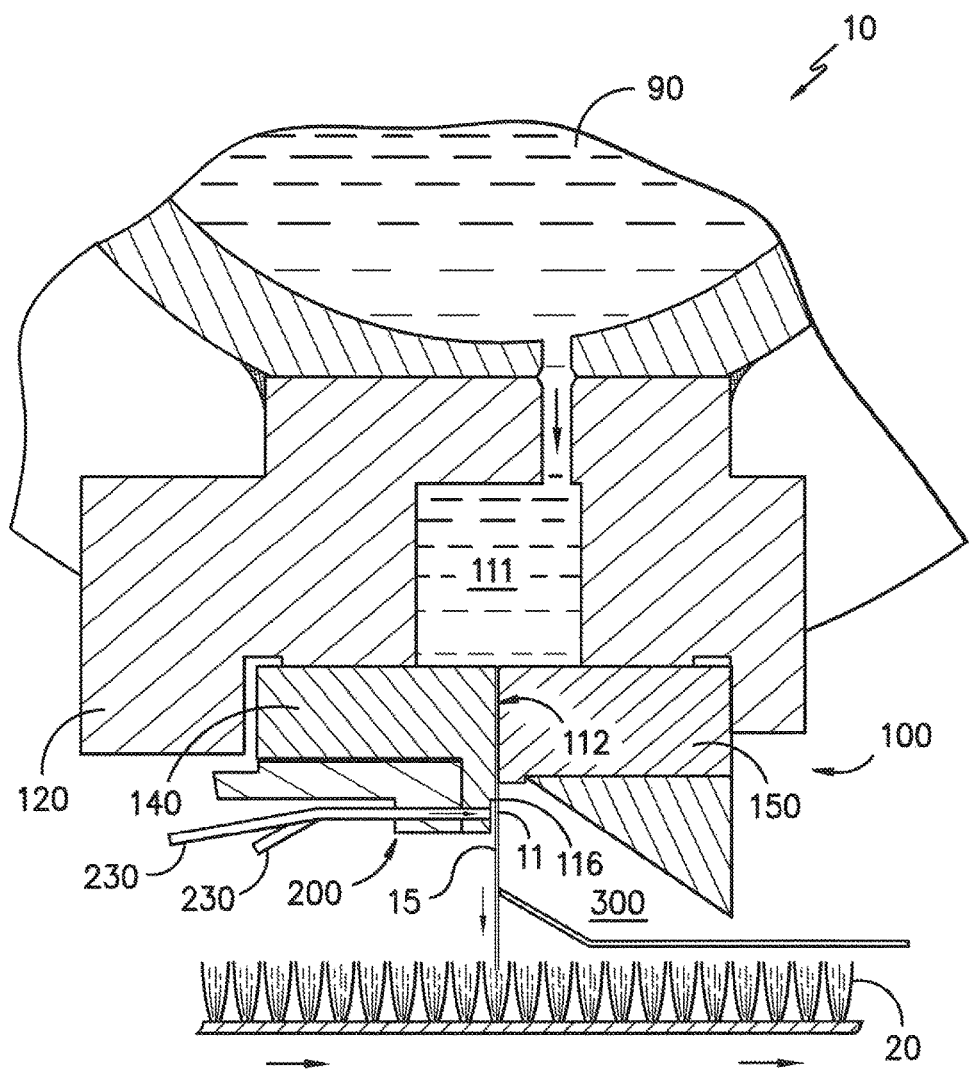
FIG. -1-

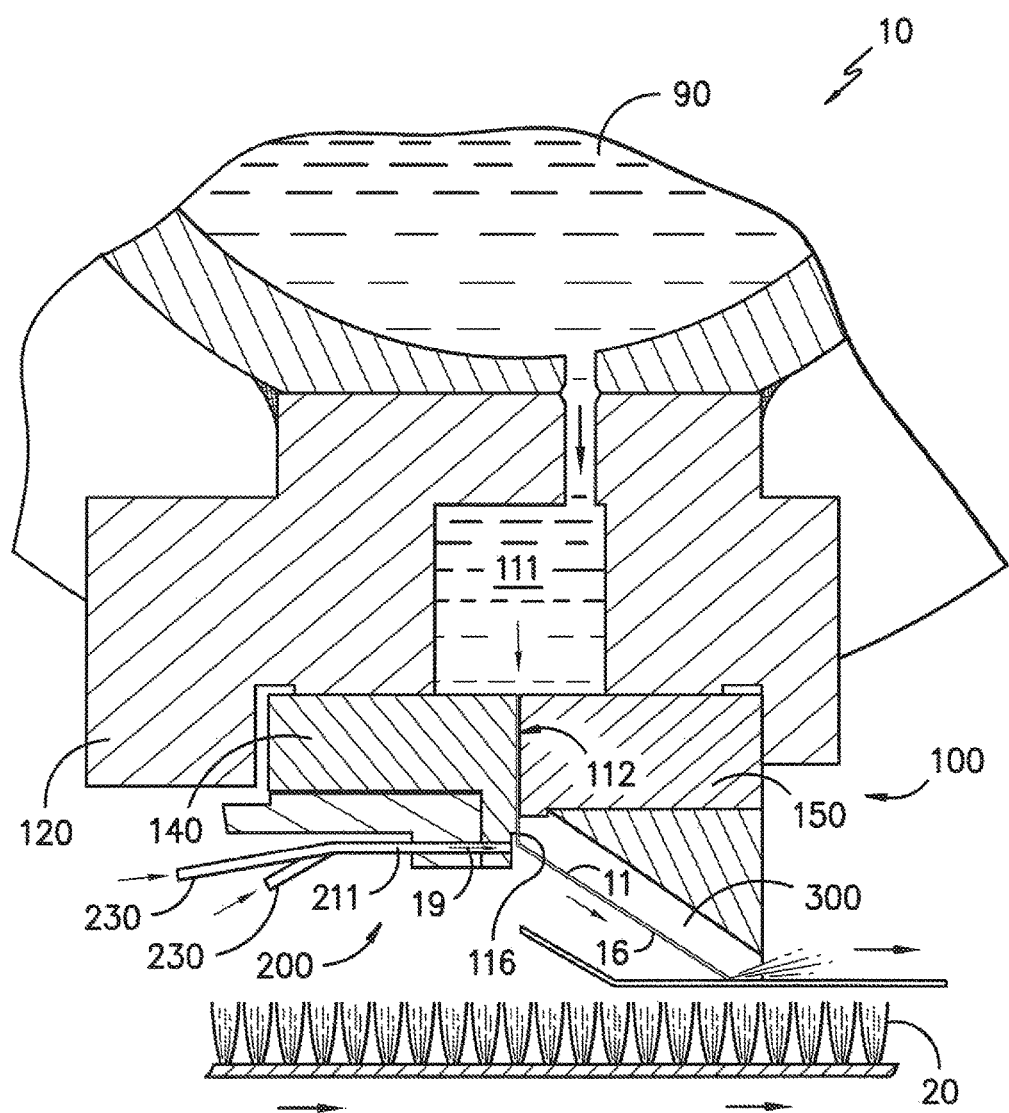
FIG. -2-

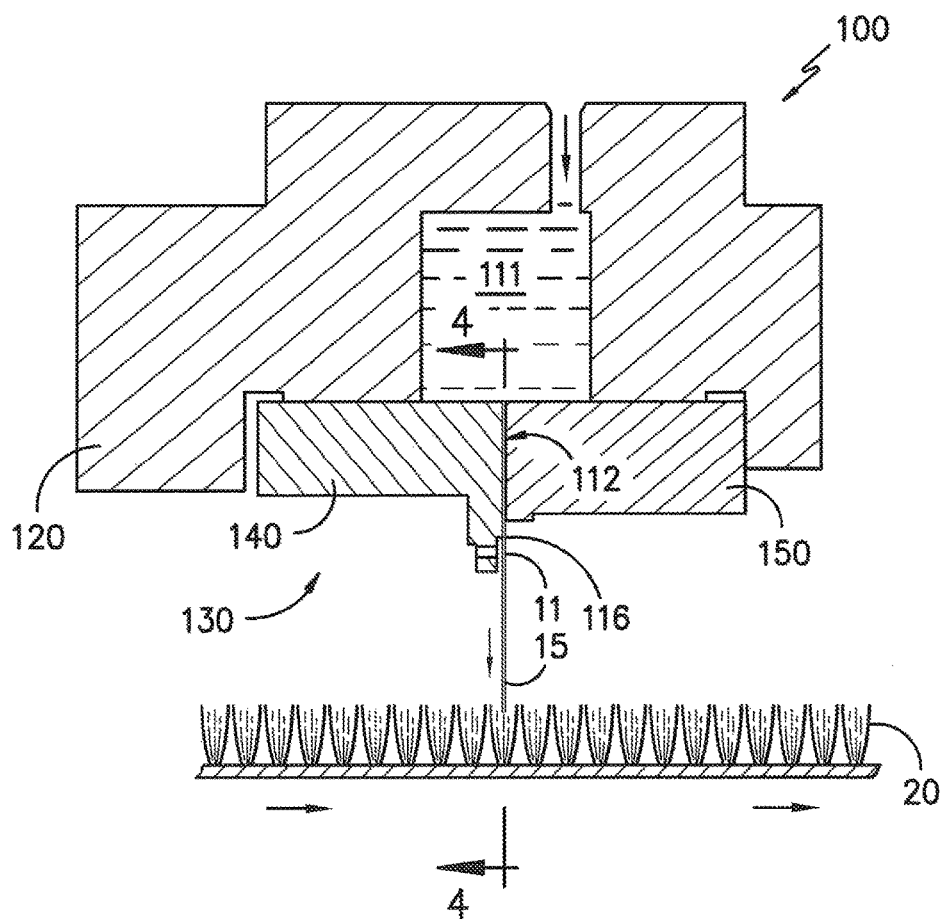
FIG. -3-

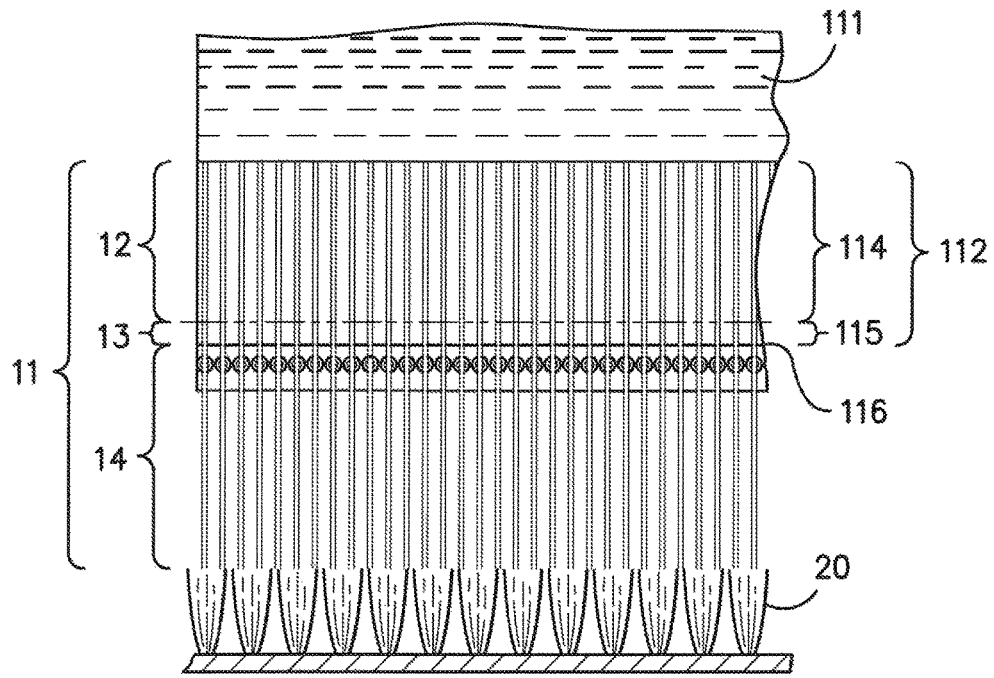
FIG. -4-
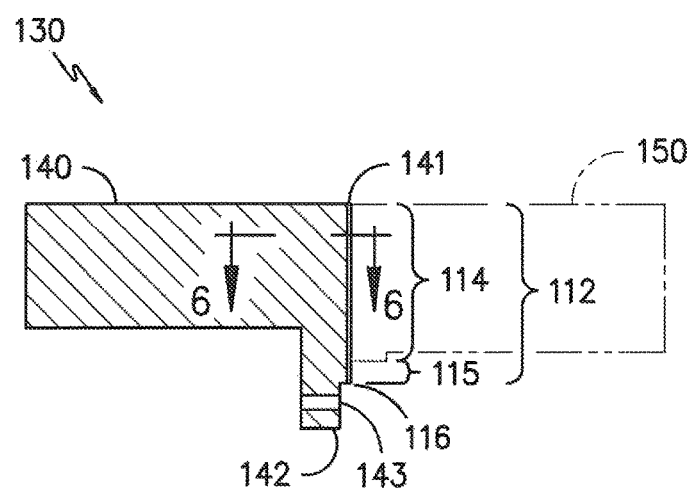
FIG. -5-

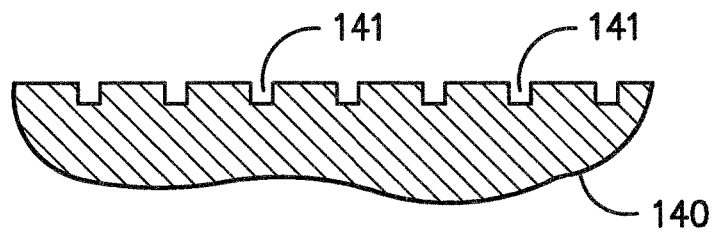
FIG. -6-
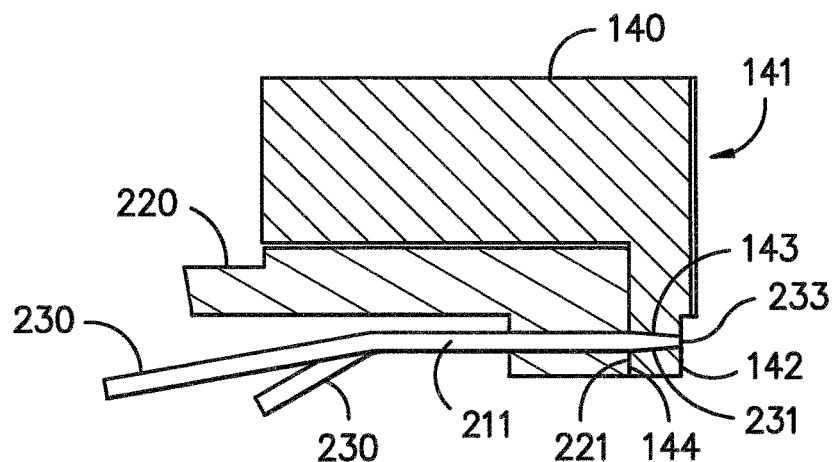
FIG. -7-
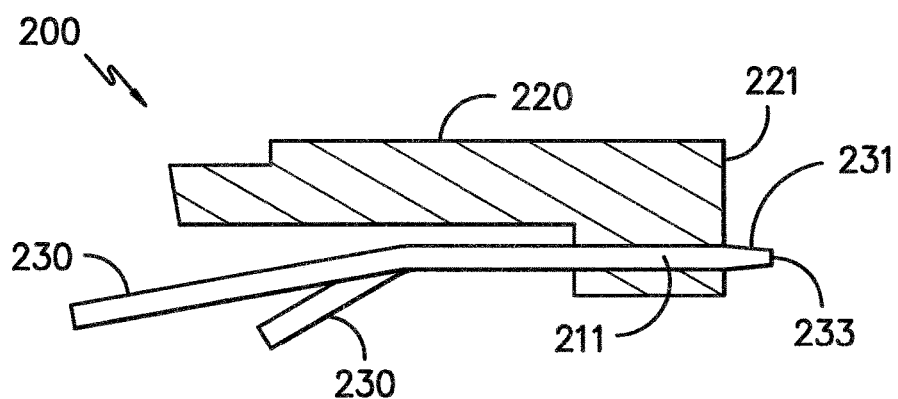
FIG. -8-

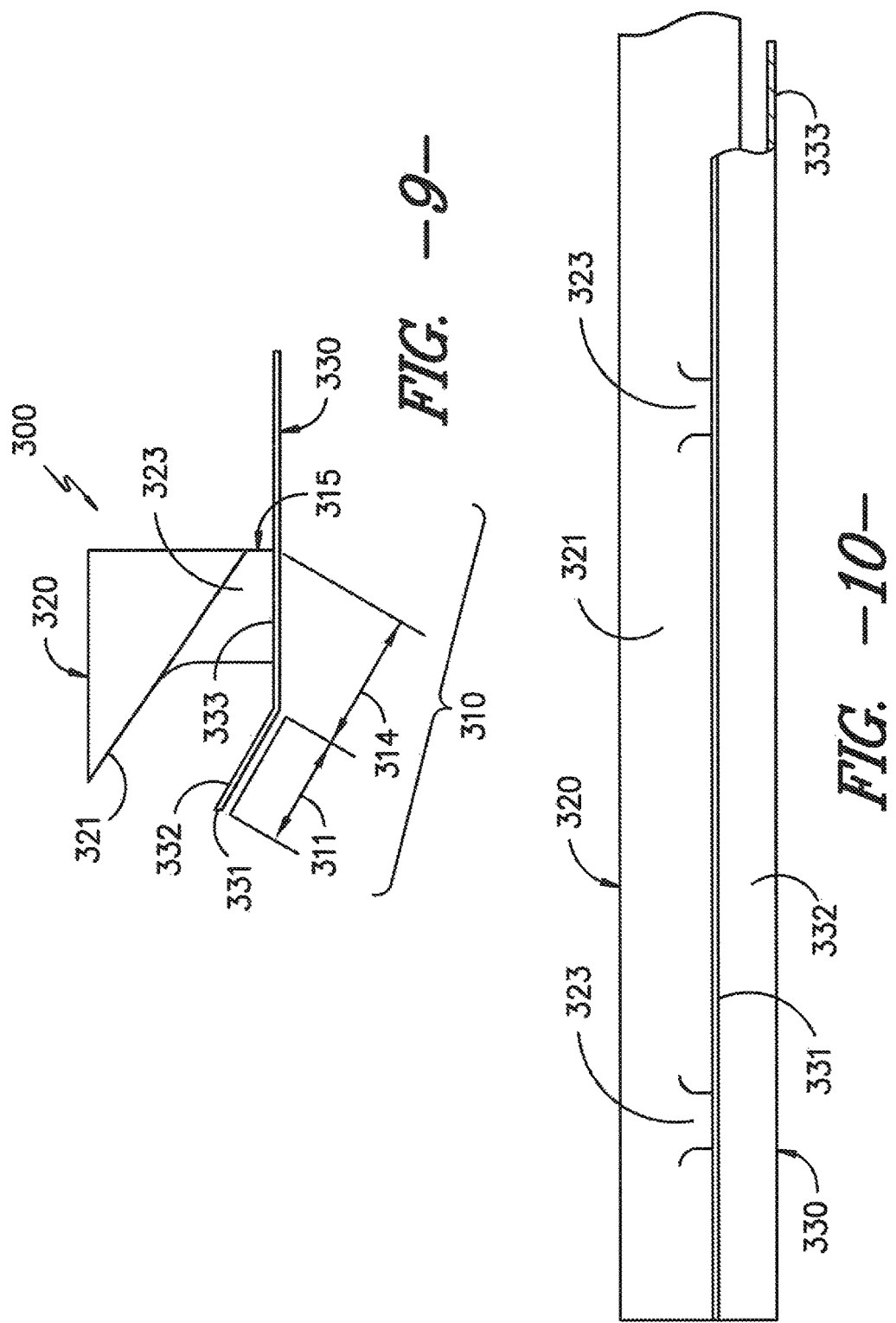

APPARATUS FOR CONTROLLED APPLICATION OF LIQUID STREAMS TO A SUBSTRATE WITH DIVERTED LIQUID COLLECTION SYSTEM

CROSS REFERENCE TO RELATED APPLICATIONS

This application claims priority to and is a continuation of co-pending U.S. patent application Ser. No. 12/850,180 entitled, "Apparatus for Controlled Application of Liquid Streams to a Substrate with Diverted Liquid Collection System," which was filed on Aug. 4, 2010, and is entirely incorporated by reference herein.

TECHNICAL FIELD

The present invention relates generally to an apparatus and method for forming one or more liquid streams having relatively small, well defined cross sectional areas which are normally directed to a target substrate, and for selectively interrupting and redirecting the flow of such liquid streams by application of gaseous fluid impingement jets transverse to the normal flow direction of the liquid streams. More specifically, the invention relates to an apparatus and method providing precise and substantially instantaneous switching between (i) a normal application mode in which a liquid stream is applied to a substrate and (ii) a diversion mode in which the liquid stream is redirected away from the substrate. Such switching is carried out in response to commands to develop desired fine scale treatment patterns across the substrate.

BACKGROUND OF THE INVENTION

Systems that provide relatively fine scale treatment patterns of liquid across a target substrate by interruption of the applied liquid streams are generally known. In prior systems, multiple liquid streams are expelled under pressure from orifice openings arranged in close, side-by-side relation. The orifice openings are surrounded circumferentially by walls defining the openings. The pressure liquid streams normally project towards a target substrate but are intermittently interrupted by application of a transverse gas jet which redirects the liquid stream away from the target substrate and into a collection reservoir to be reused. When application of the gas jet is discontinued, the liquid streams resume along the initial path. Such systems are used typically to apply intricate patterns of dye or other liquids to textile substrates, although other substrates may likewise be treated if desired.

While the prior systems work very well, it is a continuing challenge to provide improved definition in the applied pattern across the substrate while nonetheless delivering a sufficient quantity of dye or other liquid to the substrate to provide complete treatment. It is also a continuing challenge to provide reduced complexity in the system set-up as well as enhanced functionality in the collection of unused liquid.

SUMMARY OF THE INVENTION

The present invention provides advantages and alternatives over prior constructions and practices by providing an improved system for application of liquid streams to a substrate. The system of the present invention incorporates open face flow channels prior to discharge along an unconstrained flow path. The present invention further provides an improved self-aligning modular assembly for delivery of impingement stream to the liquid streams. The present invention further provides an improved arrangement for collection of the liquid stream in a diverted flow path in response to application of the impingement stream, without excess residue build-up.

In accordance with one exemplary aspect, the present invention provides an apparatus for intermittently applying one or more liquid streams to a target substrate. The apparatus includes a liquid supply in the form of a manifold for holding a liquid and a plurality of liquid conveyance channels in fluid communication with the liquid supply. The liquid conveyance channels are adapted to carry liquid away from the manifold and towards the target substrate. At least one of the liquid conveyance channels includes a first segment defining a substantially fully enclosed liquid passageway and a second segment downstream from the first segment. The second segment has an open-face flume configuration. The end of the second segment defines an open sided liquid outlet projecting towards the target substrate such that a liquid stream exiting the second segment is expelled towards the target substrate along a normal flow path substantially aligned with the liquid conveyance channel. A plurality of impingement jet directional passages are positioned at an elevation between the liquid conveyance channels and the target substrate. At least one of the impingement jet directional passages has a central axis oriented in an intersecting relation to the undisrupted flow path of a corresponding liquid stream expelled from the corresponding liquid conveyance channel. The impingement jet directional passages are adapted to selectively deliver an impingement stream to divert the corresponding liquid stream away from the undisrupted flow path into a diverted flow path. A liquid collection assembly captures the liquid stream in the diverted normal flow path.

In accordance with another exemplary aspect, the present invention provides an apparatus for intermittently applying one or more liquid streams to a target substrate. The apparatus includes a liquid supply in the form of a manifold for holding a liquid and a channel module with a plurality of liquid conveyance channels in fluid communication with the manifold. The liquid conveyance channels are adapted to carry liquid away from the manifold and towards the target substrate. The end of the liquid conveyance channel defines a liquid outlet projecting towards the target substrate such that a liquid stream exiting the liquid conveyance channel is expelled towards the target substrate along a normal flow path substantially aligned with the liquid conveyance channel. Below the liquid outlet, the channel module has a landing. The landing has impingement jet positioning apertures with central axis that align with the central axis of a corresponding liquid conveyance channel. The apparatus also includes an impingement jet module having a plurality of individually activatable impingement jet tubes mounted in an impingement jet body. The impingement jet tubes include distal ends extending from the impingement jet body, which are arranged in a pattern adapted for coaxial, plug-in into corresponding impingement jet positioning apertures in the landing of the channel module. The impingement jet tubes are adapted to selectively deliver the impingement stream to divert the corresponding liquid stream away from the undisrupted flow path into a diverted flow path. A liquid collection module captures the liquid diverted from the normal flow path.

In accordance with still another exemplary aspect, the present invention provides an apparatus for intermittently applying one or more liquid streams to a target substrate.

The apparatus includes a liquid supply in the form of a manifold for holding a liquid and a channel module with a plurality of liquid conveyance channels in fluid communication with the manifold. The liquid conveyance channels are adapted to carry liquid away from the manifold and towards the target substrate. The end of the liquid conveyance channel defines a liquid outlet projecting towards the target substrate such that a liquid stream exiting the liquid conveyance channel is expelled towards the target substrate along a normal flow path substantially aligned with the liquid conveyance channel. A plurality of impingement jet directional passages are positioned at an elevation between the liquid conveyance channels and the target substrate. At least one of the impingement jet directional passages has a central axis oriented in an intersecting relation to the undisrupted flow path of a corresponding liquid stream expelled from the corresponding liquid conveyance channel. The impingement jet directional passages are adapted to selectively deliver an impingement stream to divert the corresponding liquid stream away from the undisrupted flow path into a diverted flow path. A liquid collection module captures the liquid diverted from the normal flow path. The liquid collection module having an entrance, funnel section, and an exit. The entrance is position for receiving the liquid stream in the diverted flow path, the funnel section is in fluid communication with the entrance and reduces in cross section as it progresses away from the entrance, and an the exit allows the fluid progressing through the liquid collection module to exit the collection module.

BRIEF DESCRIPTION OF THE DRAWINGS

The accompanying drawings, which are incorporated in and which constitute a part of this specification, illustrate a potentially preferred embodiment of the present invention, and together with the general description above and the detailed description below, serve to explain the principles of the invention wherein:

FIG. 1 is a schematic cut-away view illustrating an exemplary apparatus in accordance with the present invention showing a liquid jet assembly projecting a single pressure liquid stream towards a carpet substrate;

FIG. 2 is a view similar to FIG. 1 showing application of an impinging gaseous deflection jet from an impingement jet assembly redirecting the liquid stream away from the substrate and into a collection tray assembly;

FIG. 3 is the schematic cut-away view of the liquid jet module showing the manifold component, the channel component, and the liquid streams projecting onto the carpet substrate;

FIG. 4 is a schematic view taken generally along the line 4-4 in FIG. 3 illustrating the channel liquid channels in the channel body, and the flow of liquid streams from the manifold chamber to the carpet substrate;

FIG. 5 is an expanded schematic view of a portion of FIG. 4 with an abutting channel body cover shown in phantom;

FIG. 6 is a schematic view taken generally along line 6-6 in FIG. 5 showing the grooves in the channel body of the liquid jet module;

FIG. 7 is a schematic view illustrating a impingement jet module in place with the channel body of the liquid jet module;

FIG. 8 is a view similar to FIG. 7 showing the impingement jet delivery module separated from the channel body;

FIG. 9 is a schematic cut-away view illustrating the collection module from FIGS. 1 and 2 for capture of a liquid stream in a diverted flow path; and FIG. 10 is a side view of the collection module shown in FIG. 9.

Before the embodiments of the invention are explained in detail, it is to be understood that the invention is in no way limited in its application to the details of construction and/or the arrangements of the components set forth in the following description or illustrated in the drawings. Rather, the invention is capable of other embodiments and of being practiced or carried out in various ways. Also, it is to be understood that the phraseology and terminology used herein are for purposes of description only and should not be regarded as limiting. The use herein of "including", "comprising", and variations thereof is meant to encompass the items listed thereafter and equivalents, as well as additional items and equivalents thereof.

DETAILED DESCRIPTION OF THE PREFERRED EMBODIMENTS

Reference will now be made to the drawings, wherein to the extent possible, like reference numerals designate like characters throughout the various views. Referring now to FIGS. 1 and 2, there is shown a cross-sectional view of an exemplary liquid-jet application system 10. As illustrated, the liquid-jet application system 10 generally includes a liquid jet module 100, an impingement jet module 200 and a collection module 300. A pressurized liquid supply 90, holding a liquid, such as an ink, dye, or the like, under pressure, provides the liquid to the liquid jet module 100. The pressurized liquid passes through the liquid jet module 100 and is emitted as pressurized, coherent liquid streams 11. As shown in FIG. 1, the liquid stream 11 may be applied as an undisrupted flow path 15 against the surface of a target substrate 20. In the illustrated arrangement, the substrate 20 is a textile such as a carpet, pile fabric, or the like. However, it is likewise contemplated that the substrate may be virtually any material to which a liquid pattern may be applied. When it is desired that the liquid stream 11 does not reach the substrate 20, the impingement jet module 200 provides an impingement stream 19 that engages the liquid stream 11 and creates a diverted flow path 16 for the liquid stream 11 into the collection module 300, as shown in FIG. 2.

As illustrated by the directional arrows in FIGS. 1 and 2, the substrate 20 may move relative to the liquid jet application system 10 such that the undisrupted flow path 15 of the liquid stream 11 will apply a treatment pattern of the liquid as a line or line segment that is oriented generally parallel to the direction of travel for the substrate 20. During periods when the impingement jet module 200 emits an impingement stream 19 creating the diverted flow path 16, the liquid stream 11 is diverted from the substrate 20 and the portion of the substrate 20 passing under the liquid jet module 100 goes untreated by the liquid stream 11. By way of example only, and not limitation, in the event that the substrate 20 is a carpet fabric and the liquid stream 11 is a dye, the undisrupted flow path 15 of the liquid stream 11 will dye the carpet substrate 20 with a line or line segment generally parallel to the direction of travel of the carpet substrate 20. When the impingement jet module 200 emits the impingement stream 19, the liquid stream 11 will have the diverted flow path 16 causing liquid stream 11 to divert into the collection module 300 and the portion of the carpet substrate 20 passing below the liquid stream 11 will remain undyed. By having a series of liquid jet application systems 10 perpendicular to the direction of travel of the carpet substrate 20, the dye can be applied across the width of the carpet substrate 20. By having a plurality of liquid jet application systems 10 in series in the direction of travel for the substrate 20, each liquid jet application system 10 can apply liquid streams 11 of different liquids, such as different dye colors, across the surface of the substrate 20 to obtain different patterns of the different liquids (such as different colors) on the substrate 20.

Referring now to FIG. 3, the liquid jet module 100 generally includes a manifold component 120 and a liquid channel component 130. In the embodiment illustrated, the liquid channel component 130 includes liquid channels 112 that are in fluid communication with a manifold chamber 111 in the manifold component 120. Opposite to the manifold component 120, the liquid channels 112 each have a liquid discharge end 116 that the liquid streams exit the channel component 130. The liquid channels 112 are formed by groves 141 in a channel body 140 and a channel body cover 150. In the embodiment illustrated, the manifold chamber 111 is primarily formed by a manifold body 120, which is enclosed by the channel body 140 and the channel body cover 150. The pressurized liquid supply 90 is in fluid communication with the manifold chamber 111, and the manifold chamber 111 provides a supply source feeding the liquid through the liquid discharge ends 116 in the array of liquid channels 112 to create the liquid streams 11 that are emitted towards the substrate 20.

It is contemplated that each liquid stream 11 will have a relatively small cross-sectional area to provide a finer pattern control on the application of liquid streams 11 across the substrate 20. As will be appreciated and illustrated in FIG. 4, such fine diameter streams may be arranged in a side-by-side arrangement to one another so as to define a substantially continuous curtain of liquid oriented transverse to the travel direction of the substrate 20. Such an arrangement permits detailed liquid application patterns across the target substrate 20 by selectively discontinuing individual liquid streams 11 and/or groups of liquid streams 11. By way of example only, and not limitation, the liquid streams 11 may have a diameter of less than about 150 mils, and more preferably less than about 100 mils, and most preferably about 3 to about 30 mils, although greater or lesser effective diameters may likewise be utilized. In order to provide fine-scale patterning across the substrate 20, it is desirable to maintain the cross sectional integrity of the liquid stream 11 along the travel path between the liquid jet module 100 and the substrate 20. The present invention provides a multi-stage liquid travel path for delivery of the liquid stream 11 from the manifold chamber 111 to the substrate 20, which is believed to improve the cross sectional integrity of the liquid stream 11 from the liquid jet module 100 to the substrate 20.

As illustrated in FIGS. 3 and 4, the liquid streams 11 progress from the manifold chamber 111 into liquid channels 112 with an enclosed first stage 12 and then through a open directed second stage 13, then exits the liquid channels 112 through liquid discharge ends 116 associated with individual liquid channels 112 along an unconstrained third stage 14 to the substrate 20. In the enclosed first stage 12, the liquid forming the liquid streams 11 passes through an enclosed first segment 114 of the liquid channel 112 created by the grooves 141 in the channel body 140 which are enclosed by the channel body cover 150. As illustrated in FIG. 6, the grooves 141 in the channel body 140 have a substantially rectangular shaped cross section, although other geometries may be used if desired, such as substantially circular or "U" shaped cross sections. Also the face the channel body cover 150 enclosing the grooves 141 in the embodiment illustrated is substantially flat, although it may include complementary grooves for alignment with the grooves 141 in the face of the channel body 140. In the open directed second stage 13, the liquid forming the liquid streams 11 passes through open flume second segment 115 created by the grooves 141 in the channel body 140, which are not enclosed by the channel body cover 150. That is, the liquid stream 11 is not bounded on all sides, such as being bounded by only two or three sides. In this area of the channel body 140, the channel body cover 150 does not extend to cover the groves 141, thereby creating the open flume-like configuration. Thus, the liquid streams 11 within the second segment 115 have an outer face which is free from an opposing constraining boundary surface and liquid traveling along the liquid channels 112 transitions from the enclosed first segment 114 in the first stage 12 to the open-faced second segment 115 second stage 13. Following the second stage 13 created by the open faced second segment 115, the liquid streams 11 exit the liquid channels 112 through associated liquid discharge ends 116 along an unconstrained third stage 14 of the liquid conveyance path in which the liquid streams 11 are normally substantially aligned with the liquid channels 112, but no longer are bounded or guided by the liquid channels 112. In this third stage 14 the liquid streams 11 are unconstrained and unguided by external boundary surfaces.

It is believed that transitioning from the enclosed first stage 12 to the open faced second stage 13 prior to discharge into the unbounded space of unconstrained third stage 14 is beneficial in promoting the coherency and overall stability of the liquid streams 11. While not meaning to be constrained to a particular theory, it is believed that the open face of the second stage 13 allows the liquid stream 11 to dissipate static pressure before being released into an unconstrained or unguided stream. It is believed that a sudden abrupt change from a fully enclosed stream to a completely unenclosed stream may result in the expansion of the static pressure in the liquid stream to create cross sectional disruptions that will unpredictably expand the cross sectional size of the stream, or create uneven cross sections in the stream prior to being received by the substrate 20. In practice, the length of the second stage 13 is preferably at least four (4) times the largest cross-sectional dimension of the liquid channels 112 provides an improved transition and guidance of the liquid stream that minimizes these disruptions. By way of example only, and not limitation, according to one practice the width dimension of the liquid channels 112 in the second segment 115 is about 14 mils. Accordingly, in that exemplary arrangement, the length of the second stage 13 is preferably about 56 mils or greater. Of course, larger and smaller effective diameters may likewise be utilized, if desired. As shown in FIG. 5, the terminal ends of the second segment 115 define open sided outlets projecting towards the target substrate 20.

The liquid streams 11 will travel from the liquid channels 112 to the substrate 20 as substantially cohesive and stable units. However, it is also desirable to have the capability to substantially instantaneously prevent the liquid stream 11 from being applied to the substrate 20, followed by substantially instantaneous reapplication of the liquid stream 11 to the substrate 20 on demand so as to control the pattern application of the liquid onto the substrate 20 with a degree of definition and precision. To this end, the liquid streams 11 may be manipulated by the application of the gaseous impingement stream 19 from the impingement jet module 200 to provide manipulated patterning of the liquid stream 11 on the substrate 20, as previously described and illustrated in FIG. 2. The impingement jet module 200 includes an impingement stream directional passage 211 that emits and directs the impingement stream 19. Each impingement stream directional passage 211 has a central directional axis that intersects a central directional axis of an associated the liquid channel 112 in the liquid jet module 100, down stream from the liquid jet module 100 in the unconstrained third stage 14 of the liquid streams 11. In the embodiment illustrated, the impingement stream directional passage 211 emits the impingement stream 19 towards a location on the liquid stream 11 at is opposite of the location on the liquid stream 11 that was unconstrained in the open directed second stage 13 of the liquid stream 11.

Referring now to FIGS. 2, 3, 4, 5, 7 and 8, the channel body 140 of the channel component 130 includes a recessed landing 142 at the end of the grooves 141, which is spaced a short distance away from the liquid streams 11 exiting the liquid channel 112. A series of impingement jet positioning apertures 143 are located in the recessed landing 142, and the central axis of each impingement jet positioning aperture 143 intersects with the central axis of a corresponding liquid channel 112 below the liquid discharge end 116 of that liquid channel 112. As illustrated, the impingement jet positioning apertures 143 may be arranged in side-by-side relation such that the impingement streams 19 are arranged to project along a substantially common plane. However, other arrangements may be used if desired. On the opposite side of the recess landing 142 from the exit of liquid stream 11 from the grooves 141 is an impingement jet mounting surface 144.

Referring now to FIGS. 2, 7 and 8, the impingement jet system 200 includes an impingement jet module body 220 housing an array of side-by-side gas tubes 230. Each of the gas tubes 230 are spaced and positioned in the module body 220 at the same spacing and layout as the impingement jet positioning apertures 143 in the channel body 140. The module body 220 has a mounting surface 221, and each of the gas tubes 230 includes a distal end 231 extending from the mounting surface 221. When the impingement jet module 200 is installed, the impingement jet module mounting surface 221 of the impingement jet delivery system 200 engages the impingement jet mounting surface 144 of the channel body 140 and the distal ends 231 of the gas tubes 230 project into the impingement jet positioning apertures 143 of the channel body 140. The outer diameter of the gas tubes 230 will preferably correspond substantially with the inner diameter of the impingement jet positioning apertures 143 of the channel body 140 such that a secure plug-in relation is achieved upon insertion of the distal ends 231. In order to accommodate the distal ends 231 of the gas tubes 230, the impingement jet positioning apertures 143 in the channel body 140 are tapered with the wider end near the impingement jet mounting surface 143 and the narrower end near the landing 142. Alternatively, or in addition, the distal ends 231 of the gas tubes 230 can be tapered with the larger end near the impingement jet body 220 and the narrower end near the proximal end 233. It has also been found that, in a preferred arrangement, the distal ends 231 of the gas tubes 230 terminate flush with the surface of the landing 142 closest to the liquid streams 11, thereby avoiding crevasses and corners that overspray liquid from the liquid streams 11 might accumulate and create errant drops.

The interior of the gas tubes 230 create the impingement stream directional passages 211. As will be appreciated, since the gas tubes 230 plug into the corresponding impingement jet positioning apertures 143, there is no need or ability to adjust the position of the gas tubes 230. Rather, that position is pre-established and maintained by the position of the jet positioning apertures 143. The position of the impingement stream directional passage 211 will have a central axis that intersects a central axis of the corresponding liquid channel 112 below the liquid discharge end 116 of that liquid channel 112, and preferably in a perpendicular relationship.

According to the potentially preferred practice, the gas directional passages 211 in the impingement jet system 200 have a diameter which is greater than the width dimension of the corresponding liquid channel 112 in the liquid jet module 100, and resultant liquid streams 11. Most preferably, the cross sectional diameter of the gas directional passages 211 will be as large a possible while maintaining the substantially centered relation relative to the corresponding liquid streams 11, and not allowing the impingement stream 19 therefrom to interfere with the adjacent liquid streams 11 or the adjacent impingement streams 19. In this regard, it is desirable that the diameter of the gas directional passages 211 are at least as large as the diameter of the lines feeding into the gas tubes 230 such that the gas directional passages 211 do not create a flow restriction in the system. By way of example only, a diameter of about 43 mils for the gas directional passages 211 has been found to provide good performance when used with liquid channels 112 having a cross-section of about 14 mils, although larger or smaller diameters may be used if desired.

The impingement jet system 200 may be installed into, and removed from, the liquid jet module 100 as a single module. Of course, in actual practice, the impingement jet module 100 may be number of such modules disposed across the row of liquid streams 11, each of which may incorporate a separate plurality of gas tubes 230. In the event that one or more gas tubes 230 becomes damaged, the individual module containing that gas tube may simply be removed and replaced with minimal disruption.

The gas tubes 230 each may be operatively connected in fluid communication to a discreet supply line (not shown) which selectively delivers pressurized air or other gaseous fluid to the gas tube 230. This selective delivery of pressurized gaseous fluid to individual gas tubes 230 is activated by valves which open and close based on instructions from a computer or other command device. As will be appreciated, during periods when a no pressurized gas is supplied to a gas tube 230, the liquid stream 11 associated with that gas tube 230 passes in an undisrupted flow path 15 to the substrate 20. Conversely, during periods when pressurized gas is supplied to a gas tube 230, the resulting impingement stream 19 engages the liquid stream 11 which is then diverted away from the substrate 20 in a diverted flow path 16 and the portion of the substrate 20 in passing under the normal position of that liquid stream 11 goes untreated. As shown in FIG. 2, the application of this diverting force is carried out within the unconstrained third stage 14 of the liquid stream 11 downstream from the open directed second stage 13.

As shown in FIGS. 1 and 2, the application system 10 includes a collection module designated generally as 300. The collection module 300 from FIGS. 1 and 3 is illustrated in further detail in FIGS. 9 and 10. The collection system 300 includes an angle body 320 and an opposing deflection blade 330. The angle body 320 is mounted to the channel cover block 140 of the liquid jet module 100 and has a deflection surface 321 which is positioned near the liquid stream 11 exiting the liquid jet module 100. The deflection surface 321 of the angle body 320 is oriented at an acute angle from the liquid stream 11 when measured from the downstream position of the liquid stream 11. The position and angle of the deflection surface 321 is selected in a manner to hinder any mist or overspray of the liquid stream 11 from circling around in an eddy like current back out of the collection module 300. The deflection blade 330 is mounted to the angled body 320 by standoffs 323 in a manner that creates a discharge passage 310 for the liquid stream 11 to pass through. The standoffs 323 are spaced intermittently along the cross machine length of the collection assembly 300. This arrangement allows the deflected liquid stream 11 through the discharge passage 310 and into a recovery sump (not shown) for reuse. By way of example only, and not limitation, the slot openings between the standoffs 323 may have a height dimension of about 90 mils, although larger or smaller heights may be used, if desired.

As illustrated, the discharge passage 310 has a collection section 311, a funnel section 314, and an exit section 315. The collection section 311 is positioned adjacent to the liquid stream 11 as the liquid stream 11 exits the liquid jet module 100, and such that the diverted flow path 16 of the liquid stream 11 will enter the collection section 311 upon application of the impingement stream 19. The collection section 311 is illustrated as having a short length before reaching the funnel section 314, but could also be only the opening for the funnel section 314. Inversely, the exit section 315 is illustrated as the opening for the funnel section 314, but could have a short length extending away from the funnel section 314. As illustrated, the liquid jet application system 10 is positioned with the liquid streams 11 progressing vertically to the substrate 20. In this position, it is preferable that a vacuum be applied to the exit 315 of the discharge passage 310 to insure proper removal of the liquid stream 11 in the diverted flow path 16. However, the liquid jet application system 10 can be positioned at an angle from the vertical in a manner that gravity will assist the progression of the liquid stream 11 in the diverted flow path 16 from the discharge passage 310 without a vacuum.

As illustrated, the deflection blade 330 includes leading edge 331, a guidance surface 332, and a contraction surface 333. The deflection blade 330 is relatively thin. By way of example only, in one potentially preferred embodiment the deflection blade 330 may have a thickness of about 20 mils, although thicker or thinner blades may be used if desired. The leading edge 331 is position on the lower side of the entrance 311 adjacent to the undisrupted flow path 15 of the liquid stream 11, and the surface of the leading edge 331 is flat and substantially parallel to the undisrupted flow path 15 of the liquid stream 11. The guidance surface 332 progresses away from the leading edge 331 and angle between the leading edge 331 and the guidance surface 332 creates a knife edge adjacent to the undisrupted flow path 15 of the liquid stream 11. Because of the closeness of the leading edge 331 to the liquid stream 11, the knife edge will "cut off" any hook shape in the liquid stream 11 created when the liquid stream 11 transitions from the undisrupted flow path 15 to the diverted flow path 16, or back. According to one potentially preferred practice, the spacing between the liquid stream 18 and the leading edge 331 is set at about 5 to about 15 mils although larger or smaller spacing levels may be used, if desired.

The guidance surface 332 leads away from the leading edge 331 and is preferably substantially parallel to a deflection surface 321 on the angled body 320. This portion of the guide surface 332 that is substantially parallel to the deflection surface 321 creates the collection section 311 of the collection discharge passage 310. At the rear of the guidance surface 331 of the deflection blade 330, the deflection blade 330 away from the guidance surface 331 and angles towards the deflection surface 321 of the angled body 320. The section of the deflection blade 330 that angles towards the deflection surface 321 of the angled body 320 is the contraction surface 333. The space between the deflection surface 321 and the contraction surface 333 create the funnel section 314 of the discharge passage 310. By way of example only, and not limitation, it has been found that an angle of about 150°-155° between the guidance surface 332 and the contraction surface 333 may be particularly desirable for the deflection blade 330. This angle creates a constriction in the funnel section of about 25°-30° relative to the deflection surface 321 of the angle body 320.

Upon the application of an impinging stream 19 from the gas directional passage 211 of the impingement jet module 200, a diverted flow path 16 of the liquid stream 11 is created that passes through the discharge passage 310. The disturbed flow of the liquid stream 11 enters the discharge passage 310 through the collection section 311 and is routed towards the funnel section 314. Upon entering the collection section 311, the knife edge of the deflection blade 330 cuts off any of the liquid stream 11 that might not follow the same path as the fully diverted stream 16 into the discharge passage 310. The deflection surface 321 of the angled body 320 maintains a distance to the guidance surface 332 of the deflection blade 330 that helps prevent spray from the liquid stream 11 drifting back out of the discharge passage 310 due to circling currents onto parts of the equipment that might allow accumulated liquid to condensate and drop onto the substrate 20 below. The reducing cross sectional area of the funnel section 314 causes the disrupted flow path 16 of the liquid stream 11 and the impingement stream 19 to accelerate towards, and out of the exit section 315 of the discharge passage 310 where it can be collected by a liquid recovery system (not shown). When the impingement stream 19 is terminated, the liquid stream 11 resumes its normal undisrupted flow path 15 to the substrate 20 (FIG. 1).

As will be appreciated, the present invention provides an application system which is highly functional and which can be set up and serviced relatively simply. In particular, due to the plug-in relation of the impingement jet delivery system 200 there is no need to engage in complex alignment of impingement jets with corresponding liquid streams 11. Moreover, the incorporation of the open face transitional flow stage along the flow path is believed to substantially promote a cohesive and stable liquid stream which provides fine scale patterning across the substrate 20. Further, the incorporation of the substantially parallel spaced-apart baffle and deflection blade arrangement promotes efficient and effective recovery of deflected liquid stream material. Such features, individually and in combination, promote substantially enhanced functionality and precision in the application of a spray pattern to the substrate 20.

Of course, variations and modifications of the foregoing are within the scope of the present invention. Thus, it is to be understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. the claims are to be construed to include alternative embodiments and equivalents to the extent permitted by the prior art. The term "about" means±10% when used in reference to distances.

Various features of the invention are set forth in the following claims.

What is claimed is:

1. An apparatus for intermittently applying a liquid from a pressurized source onto a target substrate (20) in a form of liquid streams (11), the apparatus comprising:
    a manifold chamber (111) for receiving the liquid from the pressurized source;
    a channel component (130) having a plurality of liquid channels (112) in fluid communication with the manifold chamber, each liquid channel of the plurality of liquid channels having a liquid discharge end (116) projecting towards the target substrate whereby the liquid from the manifold chamber passes through the plurality of liquid channels creating the liquid streams directed toward the target substrate, the channel component further having a landing (142) disposed adjacent to the liquid discharge ends of the plurality of liquid channels, the landing having a plurality of impingement jet positioning apertures (143) extending there through, each impingement jet positioning aperture of the plurality of impingement jet positioning apertures being associated with a corresponding liquid channel of the plurality of liquid channels and having a central axis oriented in an intersecting relation to a central axis of the corresponding liquid channel;
    an impingement jet module (200) having a plurality of impingement jet gas tubes (230) mounted in an impingement jet body (220) with tube distal ends (231) extending therefrom and tube proximal ends (233) opposite to the tube distal ends, each impingement jet gas tube of the plurality of impingement jet gas tubes arranged in a side-by-side relation with one another in a straight-line pattern within a common plane and having a jet tube opening, wherein each impingement jet gas tube of the plurality of impingement jet gas tubes is aligned with a corresponding impingement jet positioning aperture of the plurality of impingement jet positioning apertures, and with the tube distal ends of the plurality of impingement jet gas tubes further being inserted into the corresponding impingement jet positioning apertures, whereby an impingement stream passing through an impingement jet gas tube of the plurality of impingement jet gas tubes towards an associated liquid stream of the liquid streams will create a diverted flow path in the associated liquid stream, and wherein the tube proximal ends are bent away from the common plane to accommodate attachment of a gas supply; and
    a liquid collection module (300) adapted to capture the associated liquid stream in the diverted flow path, the liquid collection module (300) having an angle body (320) with a deflection surface (321), wherein the deflection surface (321) is oriented at an acute angle from an undisrupted flow path of the liquid streams when measured from a downstream position of the liquid streams; and
    characterized in that the jet tube openings of the impingement jet gas tubes are planar with a surface of the landing nearest to a location of the liquid streams; and
    wherein the jet tube openings of the plurality of impingement jet gas tubes are spaced at a distance of about 10 mils to about 25 mils from the undisrupted flow path of corresponding liquid streams of the liquid streams; and
    wherein the channel component includes an impingement jet mounting surface (144) on an opposite side of the landing, and wherein the impingement jet module includes an impingement jet module mounting surface (221) that the tube distal ends of the plurality of impingement jet gas tubes extend from, and wherein the tube distal ends of the plurality of impingement jet gas tubes extend into the plurality of impingement jet positioning apertures, and the impingement jet module mounting surface engages the impingement jet mounting surface of the channel component; and
    wherein the plurality of impingement jet positioning apertures are tapered with broader ends near the impingement jet module mounting surface of the impingement jet module and narrower ends near the landing of the channel component.

2. The apparatus as recited in claim 1, wherein the central axis of each of the plurality of impingement jet positioning apertures is perpendicular to the central axis of the corresponding liquid channel.

3. The apparatus as recited in claim 1, wherein an internal diameter of each of the plurality of impingement jet gas tubes is larger than a corresponding cross sectional width of the liquid discharge end in the corresponding liquid channel.

4. The apparatus as recited in claim 1, wherein the landing is located recessed from the plurality of liquid channels and a path of the liquid streams therefrom.

5. The apparatus as recited in claim 1, wherein the jet tube openings of the plurality of impingement jet gas tubes extend from the surface of the landing towards the location of the liquid streams.

6. The apparatus as recited in claim 1, wherein the apparatus includes a plurality of impingement jet modules, each of the plurality of impingement jet modules having impingement jet gas tubes with tube distal ends which are inserted into associated impingement jet positioning apertures, and wherein the tube distal ends have corresponding jet tube openings aligned with corresponding liquid streams from corresponding liquid channels.

7. An apparatus for intermittently applying a liquid from a pressurized source onto a target substrate (20) in a form of liquid streams (11), the apparatus comprising:
    a manifold chamber (111) for receiving the liquid from the pressurized source;
    a channel component (130) having a plurality of liquid channels (112) in fluid communication with the manifold chamber, each liquid channel of the plurality of liquid channels having a liquid discharge end (116) projecting towards the target substrate whereby the liquid from the manifold chamber passes through the plurality of liquid channels creating the liquid streams directed toward the target substrate, the channel component further having a landing (142) disposed adjacent to the liquid discharge ends of the plurality of liquid channels, the landing having a plurality of impingement jet positioning apertures (143) extending there through, each impingement jet positioning aperture of the plurality of impingement jet positioning apertures being associated with a corresponding liquid channel of the plurality of liquid channels and having a central axis oriented in an intersecting relation to a central axis of the corresponding liquid channel;
    an impingement jet module (200) having a plurality of impingement jet gas tubes (230) mounted in an impingement jet body (220) with tube distal ends (231) extending therefrom and tube proximal ends (233) opposite to the tube distal ends, each impingement jet gas tube of the plurality of impingement jet gas tubes arranged in a side-by-side relation with one another in a straight-line pattern within a common plane and having a jet tube opening, wherein each impingement jet gas tube of the plurality of impingement jet gas tubes is aligned with a corresponding impingement jet positioning aperture of the plurality of impingement jet positioning apertures, and with the tube distal ends of the plurality of impingement jet gas tubes further being inserted into the corresponding impingement jet positioning apertures, whereby an impingement stream passing through an impingement jet gas tube of the plurality of impingement jet gas tubes towards an associated liquid stream of the liquid streams will create a diverted flow path in the associated liquid stream, and wherein the tube proximal ends are bent away from the common plane to accommodate attachment of a gas supply; and a liquid collection module (300) adapted to capture the associated liquid stream in the diverted flow path, the liquid collection module (300) having an angle body (320) with a deflection surface (321), wherein the deflection surface (321) is oriented at an acute angle from an undisrupted flow path of the liquid streams when measured from a downstream position of the liquid streams; and characterized in that the jet tube openings of the impingement jet gas tubes are planar with a surface of the landing nearest to a location of the liquid streams; and wherein the jet tube openings of the plurality of impingement jet gas tubes are spaced at a distance of about 10 mils to about 25 mils from the undisrupted flow path of corresponding liquid streams of the liquid streams; and wherein the channel component includes an impingement jet mounting surface (144) on an opposite side of the landing, and wherein the impingement jet module includes an impingement jet module mounting surface (221) that the tube distal ends of the plurality of impingement jet gas tubes extend from, and wherein the tube distal ends of the plurality of impingement jet gas tubes extend into the plurality of impingement jet positioning apertures, and the impingement jet module mounting surface engages the impingement jet mounting surface of the channel component; and wherein the tube distal ends of the plurality of impingement jet gas tubes are tapered with larger ends near the impingement jet body and narrower ends near the tube proximal ends.

8. The apparatus as recited in claim 7, wherein the central axis of each of the plurality of impingement jet positioning apertures is perpendicular to the central axis of the corresponding liquid channel.

9. The apparatus as recited in claim 7, wherein an internal diameter of each of the plurality of impingement jet gas tubes is larger than a corresponding cross sectional width of the liquid discharge end in the corresponding liquid channel.

10. The apparatus as recited in claim 7, wherein the landing is located recessed from the plurality of liquid channels and a path of the liquid streams therefrom.

11. The apparatus as recited in claim 7, wherein the jet tube openings of the plurality of impingement jet gas tubes extend from the surface of the landing towards the location of the liquid streams.

12. The apparatus as recited in claim 1, wherein the apparatus includes a plurality of impingement jet modules, each of the plurality of impingement jet modules having impingement jet gas tubes with tube distal ends which are inserted into associated impingement jet positioning apertures, and wherein the tube distal ends have corresponding jet tube openings aligned with corresponding liquid streams from corresponding liquid channels.

* * * * *